2 Sheets--Sheet 1.

H. A. KIMBALL.
Saw Gumming and Setting Machine.

No. 168,162. Patented Sept. 28, 1875.

Witnesses.
Thomas C. Bewley
George C. Hetzel

Inventor.
Hiram A. Kimball
Stephen Ustick Attorney

N. PETERS, PHOTO-LITHOGRAPHER, WASHINGTON, D.C.

2 Sheets--Sheet 2.
H. A. KIMBALL.
Saw Gumming and Setting Machine.
No. 168,162. Patented Sept. 28, 1875.
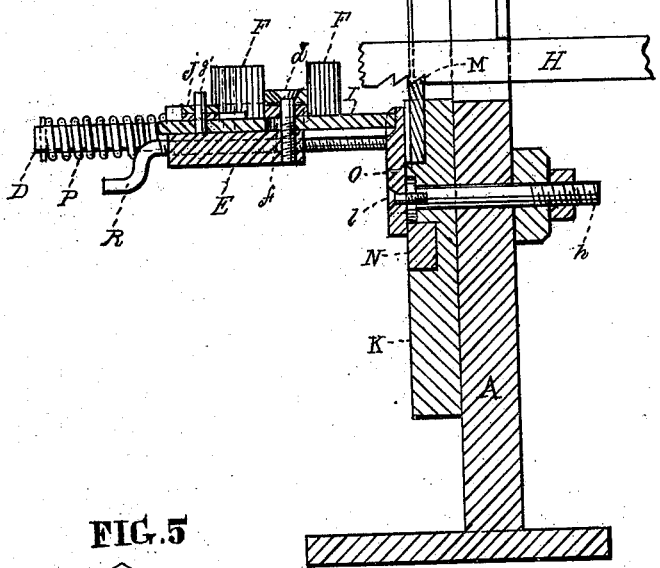
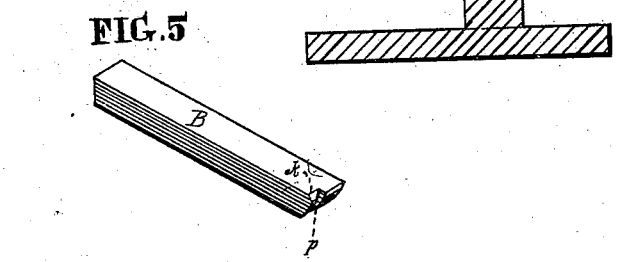
Witnesses.
Thomas C. Bewley.
George C. Hetzel.
Inventor.
Hiram A. Kimball
Stephen Ustick, Attorney

UNITED STATES PATENT OFFICE.

HIRAM A. KIMBALL, OF PHILADELPHIA, PENNSYLVANIA.

IMPROVEMENT IN SAW GUMMING AND SETTING MACHINES.

Specification forming part of Letters Patent No. 168,162, dated September 28, 1875; application filed September 9, 1875.

*To all whom it may concern:*

Be it known that I, HIRAM A. KIMBALL, of the city and county of Philadelphia, in the State of Pennsylvania, have invented an Improvement in a Combined Saw Gumming and Setting Machine, of which the following is a specification:

The machine is intended mainly for the purpose of gumming tempered narrow belt-saws, but may be used, with a slight modification, for other kinds of saws.

The invention consists in the combination of a standard in which the saw is held and through which it slides between two steel dies, having each one cutting-edge, with an oscillating cutter-head, provided with one steel die, having two cutting-edges, and with a reciprocating feeding-slide, provided with double cross-clamps for clasping the saw and feeding it forward after the cutting of each tooth. The oscillating cutter-head is provided with an adjustable double-acting cam for the purpose of moving the above-mentioned feeding-slide forward, and tightening the clamps. The slide works on two parallel tubes or rods, connected with and at right angles to the standard, which are provided with springs that react against the slide and return it to its former position when released from the action of the cam. The movement of the cam is so timed that each forward stroke is made when the single die is out of the saw and the return stroke is made while said die is cutting the saw. The length of the stroke of the slide, which determines the length of the teeth, is adjusted by means of a screw-rod, which passes through the slide and is brought into contact with the feeding-cam. The double dies are held in their places by clamps and adjusted by set-screws. Said clamps serve also for holding a circular saw to be cut, as hereinafter set forth.

Figure 1:
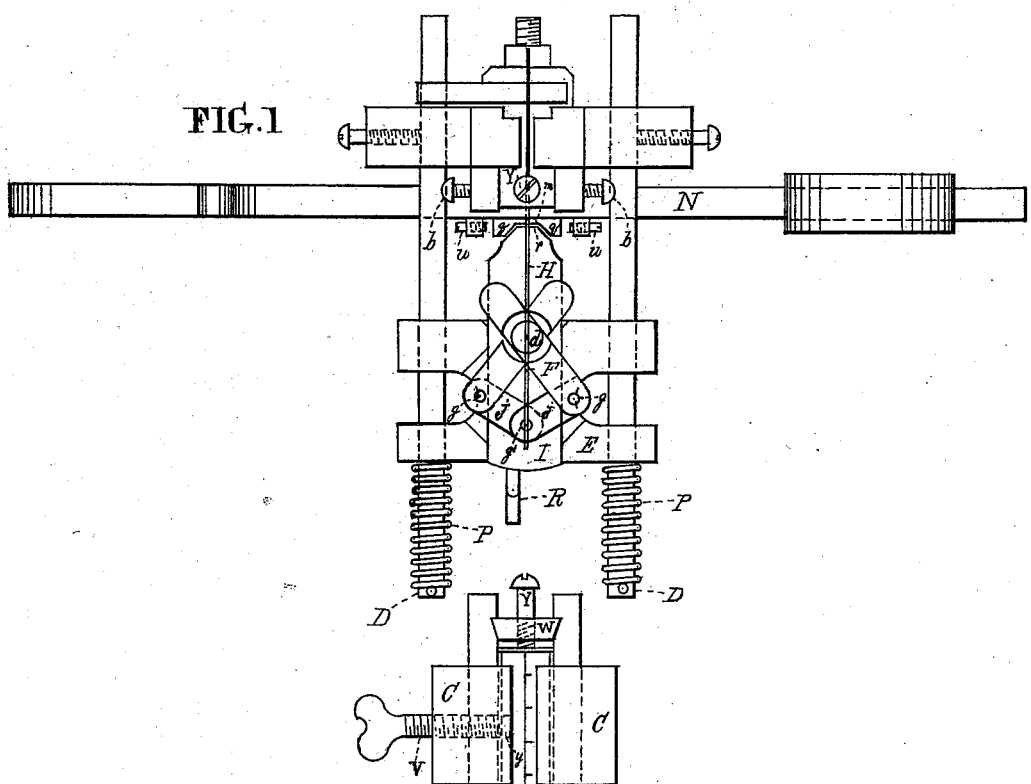
Figure 2:
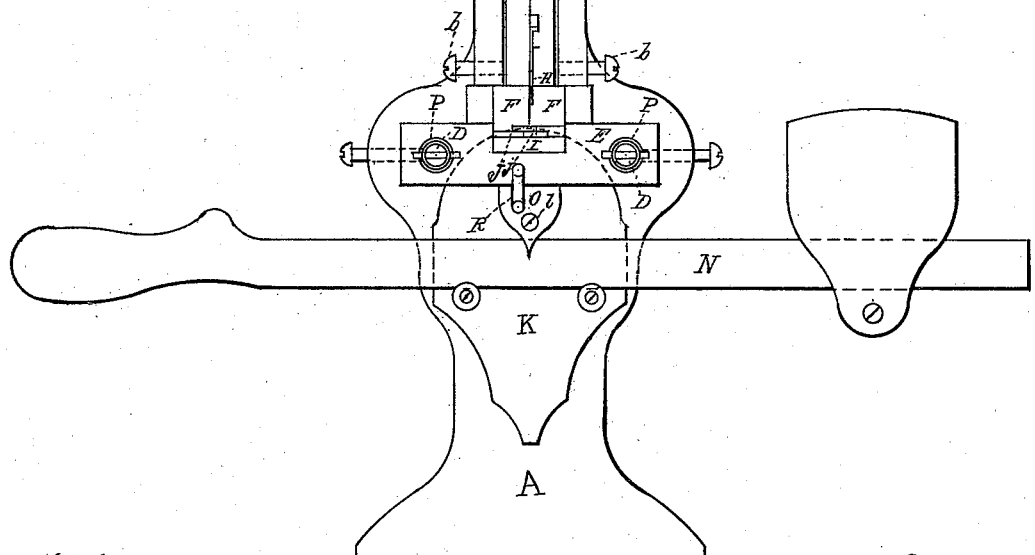

In the accompanying drawings, Figure 1 is a plan view of my improved machine. Fig. 2 is a front elevation of the same. Fig. 3, Sheet No. 2, is a vertical section at the line $x\ x$ of Fig. 1. Fig. 4 is a front view of the oscillating cutter-head K. Fig. 5 is an isometrical view of one of the guiding-dies B.

Like letters of reference in all the figures indicate the same parts.

A is a standard with which the various parts of my combined saw gummer and setter are connected. B B are steel guiding-dies, which are held in place by the clamps C C, and adjusted at their lower ends by means of screws $b\ b$, to suit the thickness of the saw, which slides between them during the cutting and setting of the teeth. D D are parallel tubes or rods held at one end in the standard A. On the other end is the reciprocating slide E, which is provided with the double cross-clamps F F for clasping the saw H and feeding it forward intermittently as the teeth are cut. The clamps are connected in the center of their half-laps to the slide E by means of the pin $d$ which passes through the slot $f$ of the plate I. Their front ends are connected, by means of pivots $g\ g$, to one end of the links J J. The other ends of the latter are connected to said plate I by means of the pivot $g'$. In front of the standard A is pivoted the oscillating cutter-head K by means of the bolt $h$. M is the double-edge cutting-die for gumming the saw. Its edges are beveled each way, so as to cut like shears. It is adjustable in the cutter-head, and fastened by means of the wedge $i$ or other suitable device. The cutter-head K is oscillated by means of the lever N. In each oscillating movement of the head a tooth is formed in the saw by one of the edges $j$ of the cutter, each edge cutting alternately. The guiding-dies B B are provided with bevels $k\ k$, against which each saw-tooth is bent in the process of gumming, to give the requisite set to the teeth, there being slots $p\ p$ through the dies for the passage of the die M. To the front side of the oscillating cutter-head K is connected, by means of the screw $l$, the plate O, which has a recess, $m$, with cams or inclines $q\ q$, which act alternately upon the tongue $r$, of the plate I, on the reciprocating slide E, to tighten the clamps F F, and give a forward movement to the slide for the feeding of the saw. By means of the vibration of the plate O the reverse movement is retarded until the die M is cutting the next tooth, thus preventing the backward movement of the saw by the clamps F F, pressed by the spiral springs P P, on the rods D D, until the die has passed through the saw. R is an adjusting screw-rod, which passes through the reciprocating slide E, its end in the reverse movement of the slide being brought against the cam-plate, thus regulating the length of its stroke, and thereby determining the length of the teeth. The vibrating cam-plate O is timed to the cutting-stroke by means of the set-screws $u$ $u$, to regulate the return movement. C C, at the upper end of the standard A, are adjustable clamps for holding the guiding-dies B B firmly in connection with the standard; they serve also for suspending a circular saw to be gummed, in which case the guides B B, and screw Y, with its supporting-block W, are removed to allow the saw to swing through the clamps C C, the saw turning on the smooth part $y$ of the screw V.

I claim as my invention—

1. The single male cutting-die M, having two cutting-edges at opposite sides to each other, in combination with duplicate dies B B, having each one cutting-edge and setting-bevel $k$ through which the single die passes in an oscillating or other alternating movement, substantially as set forth.

2. The oscillating cutter-head K, provided with the adjustable plate O, having double cams $q$ $q$, substantially as and for the purpose set forth.

3. The reciprocating slide E, in combination with the double cross-clamps F F, plate I, having a tongue, $r$, and vibrating plate O, having double cams $q$ $q$, substantially as and for the purpose set forth.

HIRAM A. KIMBALL.

Witnesses:
THOMAS J. BEWLEY,
STEPHEN USTICK.